Sept. 1, 1936.   A. RYBA   2,052,846
ELECTROMAGNETIC BAND BRAKE OR CLUTCH
Filed March 14, 1935
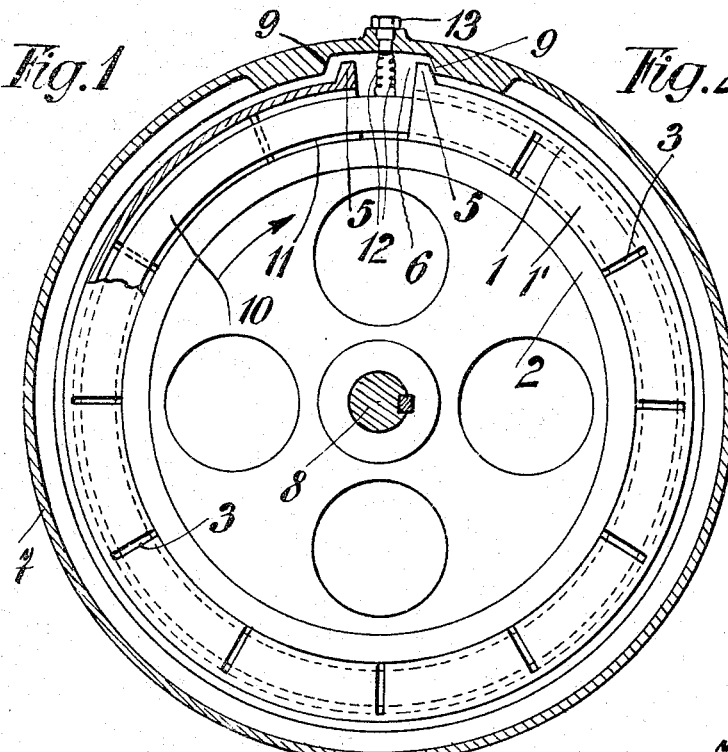
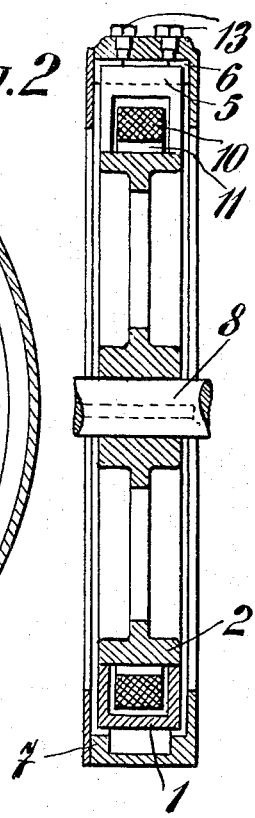
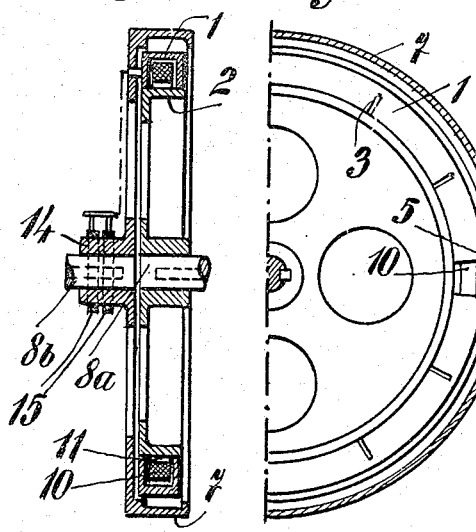
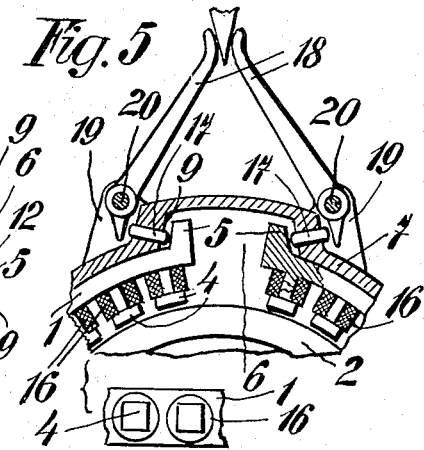

Patented Sept. 1, 1936

2,052,846

UNITED STATES PATENT OFFICE 2,052,846

ELECTROMAGNETIC BAND BRAKE OR CLUTCH

Anton Ryba, Bolzano, Italy, assignor of one-third to Josef Reinisch and one-third to Ernst Vinatzer, Bolzano, Italy Application March 14, 1935, Serial No. 10,983
In Austria September 22, 1934

6 Claims. (Cl. 188—164)

If it is desired to brake during the service a rotary moment or to transmit it to another shaft, friction surfaces are pressed the one against the other by electromagnetic or mechanical force and absorb the circumferential force or transmit the rotary moment. Setting aside the easily wearing substances, such as wood, leather, asbestos and the like, the pressing on pressures will be exceptionally great owing to the low friction coefficients of the stronger materials, and owing to the control elements also required for exerting this pressure, the mechanical elements will be so complicated, heavy and unreliable in service that in special instances where simple function and light weight are determining factors, mechanically controlled band brakes or friction clutches cannot be employed. Moreover, with mechanically controlled band brakes the same braking resistance cannot be obtained with rotary moments varying in direction of rotation.

The invention relates to an electro-magnetic band brake or clutch in which, as compared with the known constructions, much more favorable results are obtained, especially as regards simplicity, light weight and little consumption of energy. Moreover it is possible according to the invention to brake in both directions of rotation and the resultant braking resistance is absolutely the same. Further it is possible to work without preliminary tension, with the result that the axle bearings are relieved to a considerable extent.

According to the invention the electro-magnetic band brake or clutch consists of a brake band made of ferromagnetic material and provided with a suitably arranged exciter coil, and of a disc-shaped or cylindrical brake body made of the same material and around which the brake band is wound once or several times, so that by the power flux passing through the brake band and the brake body and by holding one end of the band and allowing the other end of the band to move freely, the so-called band action is obtained besides the magnetic adhesive force resulting from the excitation of the coil.

Several embodiments of the invention are illustrated by way of example in the accompanying drawing, in which:—

Fig. 1 shows an electro-magnetic band brake in cross section.

Fig. 2 is an axial section of Fig. 1.

Fig. 3 shows in axial section the employment of the invention as a clutch.

Fig. 4 is a part cross-section of Fig. 3.

Fig. 5 shows a part of a brake of modified construction in cross section with a detail thereof in plan view.

In the examples illustrated the brake band 1 made of ferro-magnetic material encircles a cylindrical drum 2 nearly once. The drum 2 is likewise made of ferro-magnetic material and keyed on a shaft 8 (Figs. 1 and 2) or 8a (Figs. 3 and 4).

According to the form of construction illustrated in Figs. 1 to 4 the brake band is of U-shaped cross-section, the band cheeks 1' acting as braking surface on the periphery of the drum 2. The band cheeks 1' have radial incisions 3 arranged at distances apart for the purpose of increasing the resiliency of the band without impairing its action. The brake band 1 may also consist of a plurality of U-shaped plates or of separate U-shaped elements which are mounted on a ring-shaped elastic band. Further, the brake band 1 may also be of rectangular cross-section and have projections 4 (Fig. 5) on the inner surface spaced at uniform distances and acting on the periphery of the drum 2. The two ends of the open brake band have noses 5 which engage in a correspondingly shaped recess 6 in the housing 7 of the device. The boundary walls 9 of the recess 6 situated in the direction of rotation of the shaft 8 (Figs. 1 and 2) or 8a, 8b (Figs. 3 and 4) form counter bearings for the brake band noses 5 against which they bear according to the direction of rotation of the rotary moment to be braked or transmitted, the end of the brake band not actually bearing remains freely movable, so that the braking effect is absolutely the same in both directions of rotation. In the hollow space of the brake band according to Figs. 1 to 4 an exciter coil 10 is inserted which need not be specially fixed as it is not subjected to any effect of force. There is an air gap 11 between the exciter coil 10 and the outer circumference of the brake drum 2, which accounts for the contraction in the diameter of the brake band 1 resulting from the wear of the arms thereof. The exciter coil 10, according to Figs. 1 and 2, is conductively connected by wires 12 to terminals 13 provided on the housing.

In the shaft clutch illustrated in Figs. 3 and 4 the housing 7 forms the second clutch half which is keyed on one of the two shafts 8a, 8b (that is the driven and driving shafts) by means of a hub 14. The current supplied to the exciter coil 10 is taken up by slip rings 15 which are mounted on the hub 14 and insulated therefrom.

If in the arrangements illustrated in Figs. 1 to 4 the exciter coil 10 is excited by switching on an electric current, preferably a direct current, an annular bead-shaped magnetic field is produced, which uses the brake band 1 and also the rim of the brake drum 2 as path and thus presses the cheeks 1' of the brake band against the circumference of the brake drum 2 with great force, immediately producing the so-called braking force. The nose 5 situated in the braking direction abuts against the corresponding counter bearing 9, whereas the nose 5 at the other end of the brake band at the same time is detached from its counter bearing by the contraction of the band and is freely movable in the recess 6. If the rotary moment to be braked or transmitted is oppositely directed, the two noses 5 will exchange their functions.

It may be necessary, on account of magnetic or mechanical constructional reasons, to make the specific pressure lighter or heavier. This is attained, in fully utilizing the magnetic properties of the brake band, by widening or narrowing the brake band cheeks 1' directly adjacent this bearing surface.

To insure that the brake band reliably detaches from the brake drum when the current is switched off, the brake band must have a preliminary tension corresponding to the remanence effect (analogously to a piston ring embracing the outer side of a piston) or a pressure spring acting between the noses 5, that is it must be outwardly resilient where inserted in the housing. In the case of magnetically highly saturated adhering surfaces, that is in the case of high specific pressures, it is advisable to reduce the cross sectional area of the contacting surfaces of the brake band cheeks 1' in order to reduce the magnetic resistance of the remaining magnetic flux path.

In the form of construction of the band brake illustrated in Fig. 5 the spaced projections 4 form pole pins provided with pole pieces on which the exciter coils 16 are mounted, so that the magnetic flux is closed through the brake drum, pole pins and band.

To enable the brake bands to be also mechanically operated in the event of the electric current failing, the ends of the brake band are connected with transmission members, so that the band ends, when these transmission members are actuated, move towards each other and tighten the brake band. Fig. 5 shows an example of such an arrangement. Bolts 17 longitudinally guided in the wall of the housing 7 and each influenced by a two-armed lever 18 each act on one of the noses 5. These levers 18 each have a short arm and a long arm and are pivotally mounted on pins 20 of lugs 19 of the housing 7. They are actuated by some suitable system of levers.

Analytic tests have shown, that in the magnetic band brake, contrary to the non-magnetic band brake band, the circumferential force increases proportionally to the radius of the brake drum, which represents an additional, extremely important advantage.

I claim:—

1. In an electro-magnetic band brake the combination of a housing, a cylindrical body in said housing, a brake band encircling said cylindrical body, said cylindrical body and said brake band being made of ferro-magnetic material, means adapted to create a magnetic field within said brake band and so arranged that the brake band is filled in its entire volume by this magnetic field, means on said housing for alternatively fixing one end of said band leaving the other free according to the direction of rotation so that, besides the magnetic adhesive force, the so-called band effect is obtained in both directions of rotation and the brake band is consequently simultaneously mechanically and magnetically stressed.

2. An electro-magnetic band brake, comprising in combination a brake drum of ferro-magnetic material, a brake band of ferro-magnetic material and of U-shaped cross-section wrapped around said brake drum, an exciter coil accommodated in the space between the side cheeks of said brake band and adapted when excited to tightly pull said cheeks against the periphery of said drum, abutments one in the path of movement of each of the ends of said brake band and each adapted when said coil is excited to arrest one band end according to the direction of movement of said band and so that the other band end is out of contact with its corresponding abutment.

3. An electro-magnetic band brake, comprising in combination a brake drum of ferro-magnetic material, a brake band of ferro-magnetic material and of U-shaped cross-section wrapped around said brake drum, an exciter coil accommodated in the space between the side cheeks of said brake band and adapted when excited to tightly pull said cheeks against the sides of said drum, a housing surrounding said brake band and having a recess in its inner side having two boundary walls extending transversely to the direction of movement of said band, and two noses one on each end of said band projecting into said recess, each of said noses adapted to contact with one of said boundary walls according to the direction of rotation of said drum and move the other nose away from the other boundary wall of the recess.

4. An electro-magnetic band brake as specified in claim 1, in which the band is of U-shaped cross section and outwardly resilient to insure detachment from the drum, side cheeks of the band having radial slits distributed around its circumference to increase the resiliency.

5. An electro-magnetic band brake, comprising in combination a brake drum of ferro-magnetic material, a brake band of ferro-magnetic material wound around said drum, pole pin-shaped projections on the inner side of said brake band, and exciter coils on said pin-shaped projections adapted to produce a magnetic flux through said brake drum, said pole projections and said brake band to pull said band tightly against said drum.

6. In an electro-magnetic band brake as specified in claim 1, means for mechanically actuating said brake band in the event of failure of the electric current, said means comprising a housing surrounding the brake band, two pressure bolts axially shiftable in said housing, one adjacent to and adapted to engage each end of said brake band, and a lever system adapted to axially shift said bolts to engage and approach the two ends of said band and press said band against the drum.

ANTON RYBA.